United States Patent [19]
Savor et al.

[11] 3,986,245
[45] Oct. 19, 1976

[54] TUBE REMOVAL METHOD

[75] Inventors: Dennis Edward Savor, Hixson, Tenn.; Charles Dean Hackett, Tunnel Hill; John Joseph Barger, Ringgold, both of Ga.; Milton Lee Blevins, Chattanooga, Tenn.

[73] Assignee: Combustion Engineering, Inc., Windsor, Conn.

[22] Filed: Apr. 30, 1975

[21] Appl. No.: 573,280

[52] U.S. Cl. .............................. 29/426; 29/157.4; 219/75
[51] Int. Cl.² ........................................ B23P 19/04
[58] Field of Search ............... 29/426, 427, 157.4, 29/157.3, 447; 219/121 P, 75

[56] References Cited
UNITED STATES PATENTS

| | | |
|---|---|---|
| 1,980,156 | 11/1934 | Emrick .......................... 29/426 X |
| 2,429,888 | 10/1947 | Moore ............................ 29/157.4 |
| 3,492,453 | 1/1970 | Hurst .......................... 219/10.51 X |
| 3,526,939 | 9/1970 | Nikkanen ....................... 29/447 X |

*Primary Examiner*—Victor A. DiPalma

[57] ABSTRACT

A method and apparatus for removing a hollow tube from a tube sheet in which the tube is held by expansive forces in the tube. A GTA arc is established between an electrode and the interior tube wall. The arc parameters are such that it melts partially through the tube wall and the arc is then translated in a desired pattern of movement along the length of the tube contained in the tube sheet. Upon re-solidfication of the melted part of the tube the compressive forces of solidification shrinkage and thermal contraction result in a reduction of the tube diameter. Apparatus is disclosed for carrying out the method which, through a dual drive arrangement, is capable of producing a variety of weld head translation paths.

8 Claims, 10 Drawing Figures

TUBE REMOVAL METHOD

BACKGROUND OF THE INVENTION

In the fabrication of heat exchangers of the shell and tube type, especially those employed for use as vapor generators in nuclear power plants, it is the practice to assemble large numbers of closely spaced, small diameter tubes within a containment shell. In plants of large capacity currently being constructed the vapor generators employ several thousands of tubes of about ¾ inch in diameter. Assembly of these tubes within the shell of effected by inserting the ends of the tubes into holes provided in a tube sheet that is formed as an integral part of the shell. The tubes are mounted to the tube sheet by expanding their ends into tight engagement within the walls of the holes. This expansive mounting may be accomplished by use of an explosive forming technique commonly referred to as "explansion".

Not infrequently, it becomes necessary to remove one or more of the tubes which has been explained into the tube sheet. This need may arise due to tube failure due to corrosion, for example, or also if a tube should become damaged during fabrication of the unit after having been mounted in the tube sheet.

In the past various types of induction heaters have been disclosed which may be inserted into a tube which is desired to be removed. Such heaters imparted induced expansive forces on the tube material which, due to the fact that the tube could not radially expand within the tube sheet, generated high stresses in the tube material. If the generated stresses exceeded the yield stress of the tube material, the material would be caused to expand axially such that, upon cooling, the tube would contract to a diameter sufficiently small to permit easy disassembly of the tube from the tube sheet. Such a device is shown and described in U.S. Pat. No. 3,492,453 to Kenneth Hurst. Induction heaters of this type suffered from the disadvantage that a relatively long period of time was required to adequately heat the tube. As a result, when a large number of tubes were to be removed, the down time of the unit was unacceptably long. A further disadvantages was that, while the shrinking of the tube was usually sufficient to permit removal from the tube sheet, it was not always sufficient to preclude damage to the tube sheet openings when the tubes were pulled out.

It is, therefore, a principle object of the present invention to teach a method and apparatus which will facilitate the removal of small diameter tubes which have been expandedly mounted within a tube sheet, in a relatively short period of time, with minimum damage to the tube sheet openings.

SUMMARY OF THE INVENTION

According to the invention there is provided a method for removing a hollow tube from a tube sheet in which the tube is held by expansive forces in the tube, which comprises melting at least a part of the tube wall and allowing the melted part of the tube to solidify whereby the compressive forces of solidification shrinkage and thermal contraction reduce the tube diameter to a dimension less than the original tube diameter and subsequently withdrawing the tube from the tube sheet. This method is carried out by establishing a gas-tungsten-arc between an electrode, disposed within the tube, and the inner surface of the tube wall. The gas-tungsten-arc may be established adjacent the upper end of the tube sheet and caused to spiral downwardly within the tube to form a spiral weld bead within the tube, thereby causing the entire portion of the tube contained within the tube sheet opening to shrink and facilitate withdrawal of the tube section therefrom. Apparatus for carrying out the method of the invention is also disclosed which permits a variety of weld bead patterns to be made depending upon the particular requirements of the job being performed.

DESCRIPTION OF THE PREFERRED EMBODIMENT

Figures 1, 2:
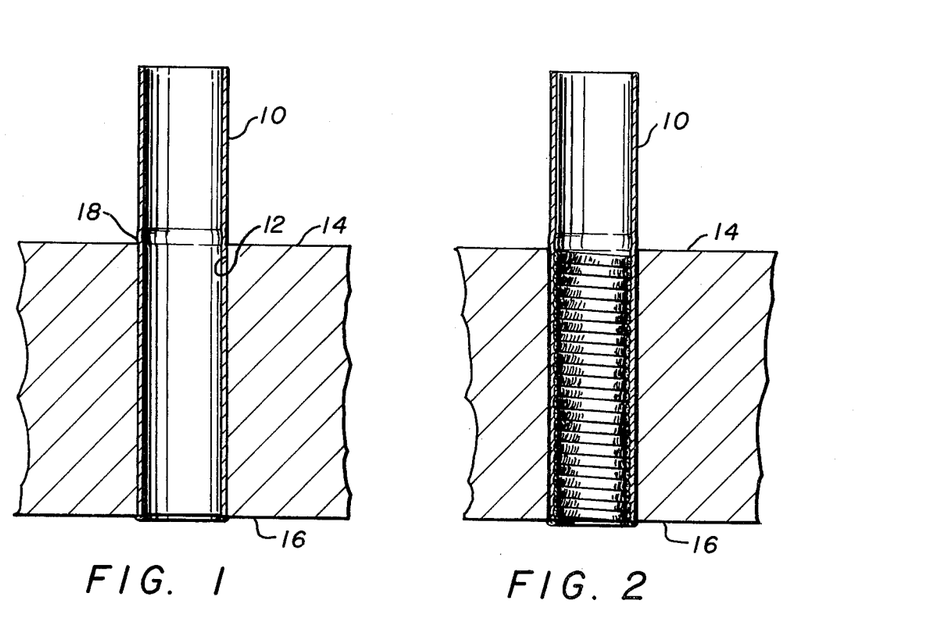
FIG. 1 is a sectional elevation showing a typical tube which has been explandedly mounted within a tube sheet.
FIG. 2 is a sectional elevation showing a tube which has been shrunk according to one embodiment of the invention.

Referring now to the drawings, FIG. 1 shows the end of the tube 10 which has been mounted in an opening 12 in a tube sheet 14 by an explosive forming operation which has caused the tube to radially expand into contact with the interior wall of the tube sheet opening. The lower end of the tube has been further attached to the outside surface of the tube sheet by a circumferential seal weld 16. The slightly enlarged section of the tube 18 adjacent the upper surface of the tube sheet was caused by the explosive force of the charge used in mounting the tube. According to the present invention, the removal of the tube 10 from the tube sheet 12 is facilitated by partially melting a portion of the interior wall of the tube, and permitting the melted part of the tube wall to re-solidify, thereby resulting in a shrinking of the tube section contained in the tube sheet. The tube may then readily be pulled from the tube sheet with little or no damage to the wall of the opening in the tube sheet.

According to a preferred embodiment of the invention, the melting of a portion of the inner surface of the tube wall is accomplished by establishing a gas-tungsten-arc (GTA) between an electrode and the inner surface of the tube wall and traversing the arc substantially the entire length of the portion of the tube which is contained in the tube sheet. According to one embodiment of the invention the GTA arc is originated near the upper end of the tube and is simultaneously linearly translated downward and rotated within the tube to produce a spiraling, overlapping weld bead on the tube inner surface. The weld bead formed by such an operation is illustrated in FIG. 2. When performed at the proper arc conditions the compressive forces of solidification shrinkage and thermal contraction occurring during re-solidification of the melted material serve to reduce the tube outside diameter to a dimension somewhat less than the original tube diameter; i.e., the diameter before explosive mounting in the tube sheet. It has been found that the amount of tube diameter reduction is proportional to the percent of tube wall that is melted. Extreme care, however, must be taken not to melt entirely through the tube wall, as this could result in severe distortion within the melted region and cause one or more of the following undesirable results:

1. weakening of the tube structure allowing fracture to occur when the tube removal force is applied;
2. cohesion of the tube to the tube sheet, and
3. limited accessability to the tube inside diameter preventing the completion of the melting process.

The depth of melting of the tube wall is governed primarily by the arc current, arc voltage, travel speed of the arc and the rate of heat transfer from the tube wall. All of these parameters may be easily measured and controlled except the rate of heat transfer. The rate of heat removed cannot be accurately predicted for a given tube as two important variables are present:

1. the extent of contact between the tube outer wall and the tube sheet, and
2. the constitution of material filling any voids which may exist between the tube and the tube sheet.

As a result, the melting procedure has been experimentally developed through trial and error under varied tube and tube sheet conditions simulating expected and worse-case conditions. While a depth of melting of the tube between about 50 to 95 percent of the tube thickness has been found to give satisfactory results, a melt depth of about 75 percent is preferred. The following are several examples of exemplary conditions for achieving adequate melting for removing a tube which has been explandedly mounted within a tube sheet. In each case the conditions apply to a tube having a wall thickness of approximately 0.050 inches and will achieve approximately 75 percent depth penetration of the tube wall.

EXAMPLE 1.

Spiraling, Overlapping Weld Beads.

The results of this method are shown in FIG. 2. A gas-tungsten-arc is established between an electrode in the interior of the tube at an elevation approximately ¼ inch below the upper surface of the tube sheet. The arc current is approximately 60 amperes, the voltage in the range of approximately 12 to 15 arc volts, and the cover gas is 5 percent hydrogen in argon. Other cover gases, e.g. 100 percent argon, may be used with appropriate changes in values of arc current and arc voltage, such changes being well within the realm of knowledge of one skilled in the art.

Once established the GTA arc is simultaneously rotated and linearly translated within the interior of the tube at approximately 7.25 RPM, and ⅛ inch per revolution downward linear translation. This combination of rotational and linear motion will create the desired overlapping weld beads within the interior of the tube. The arc motion is continued until the arc position is approximately ¼ inch above the bottom of the tube sheet. At this point the melting operation is completed and the tube section may be readily removed from the tube sheet by conventional methods.

EXAMPLE 2.

Open Spiral Weld Bead.

Figures 3, 4:
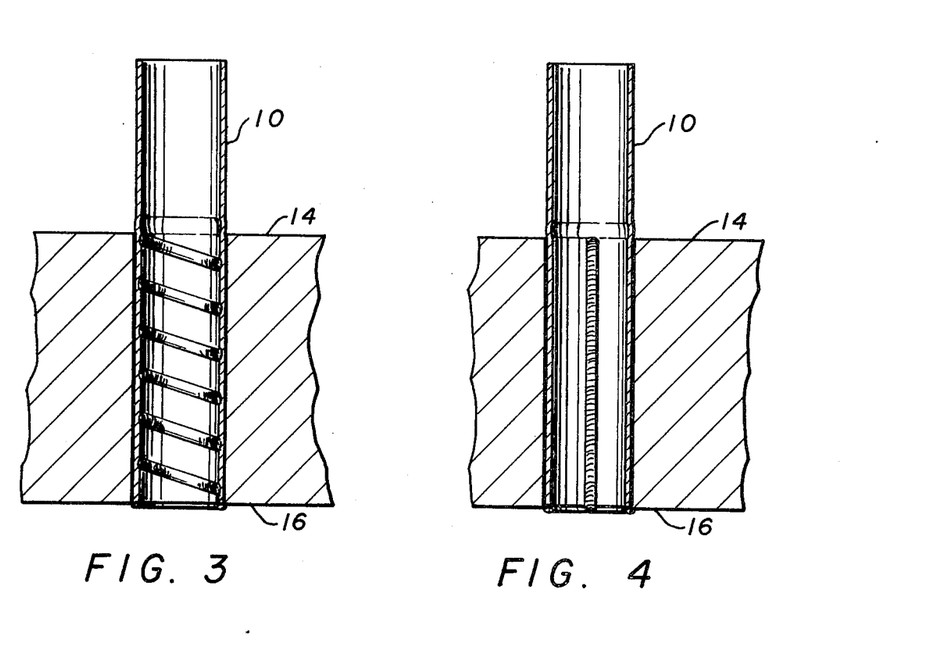
FIG. 3 is a sectional elevation showing a tube which has been shrunk according to another embodiment of the invention.
FIG. 4 is a sectional elevation showing a tube which has been shrunk according to a still further embodiment of the invention.

The results of carrying out this example are shown in FIG. 3. All of the conditions in this example are identical to Example 1 with the exception of the rate of linear translation of the GTA arc: the rate being greater than ⅛ inch per revolution, the maximum rate being governed by that which will give adequate shrinkage of the tube to permit removal of the tube from the tube sheet with minimal damage to the interior surface of the tube sheet opening. This method permits considerably more rapid melting and removal of tubes and thus is preferred over the first example when time is a factor, such as when a large number of tubes must be removed.

EXAMPLE 3.

Linear Translation of the Weld Bead.

As in the previous examples the GTA arc is established at a point approximately ¼ inch below the upper tube sheet surface. The arc voltage again in approximately 12 to 15 volts and the cover gas is 5 percent hydrogen in argon. The arc current, however, it approximately 175 amperes, and the arc itself is moved down through the tube with no rotation at a speed of approximately 24 inches per minute.

It has been found that one linear weld bead such as in created by the above conditions and illustrated in FIG. 4, may be sufficient to adequately shrink the tube to permit removal from the tube sheet, however, such a single pass tends to case the tube to "bow" and thus resist withdrawal from the tube sheet opening. Accordingly, it has been found that a second weld bead on the interior of the tube wall at a position diametrically opposed to the first bead will tend to straighten the "bow" and permit easy removal from the tube sheet. Three or more such weld beads may be used to achieve removal of the tube with the beads being equally spaced about the circumference of the tube. An identical procedure is used to create each of the vertically extending beads.

Apparatus for Performing the Method of Tube Removal

Figure 6:
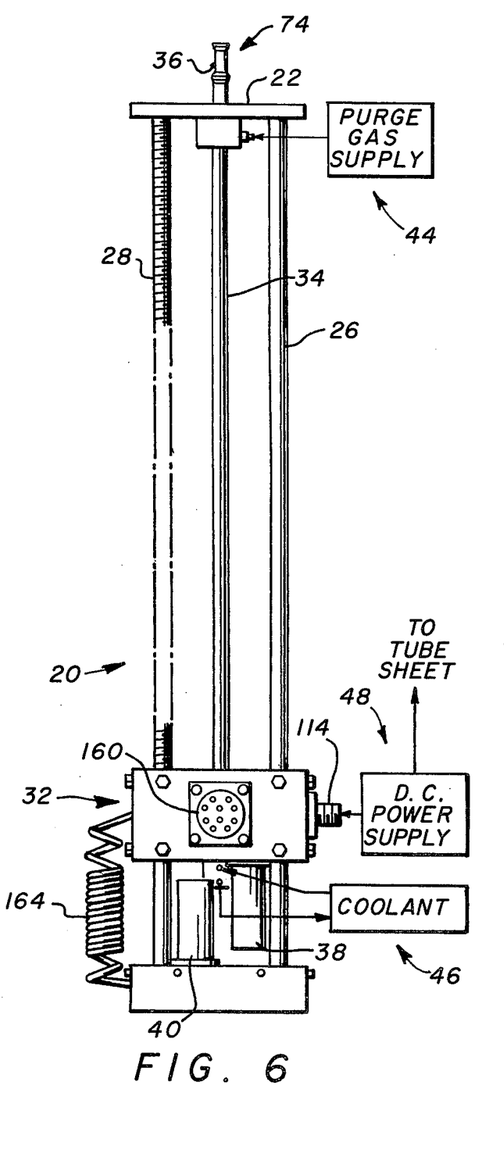
FIG. 6 is a side elevation of tube shrinking apparatus according to the present invention.

Referring to FIG. 6 reference numeral 20 generally refers to the mechanical arrangement and associated systems of the tube shrinking machine of the present invention. The structural framework for the machine is provided by four parallel elongated rods arranged to extend between the four corners of a pair of vertically spaced parallel plates. The uppermost of these plates, hereinafter referred to as the face plate 22, also serves to facilitate attachment of the tube shrinking machine to the tube sheet 14 when the machine is being used, as will hereinafter be described in more detail. The lower plate 24 serves also to house one of the two machine drive systems, again as will later be described in greater detail. Two of the vertically extending elongated rods 26 are smooth guide rods and are rigidly mounted at their upper and lower ends to the face plate 22 and the lower plate 24. These rods are positioned on diagonally opposed corners of the plates. The other two rods 28 are threaded along substantially their entire length and are mounted for rotation with respect to the face plate 22 and the lower plate 24 in roller bearings 30.

Reference numeral 32 generally identifies the torch and carriage assembly which is mounted on the guide rods 26 and threaded rods 28 in a manner which will permit vertical translation of the torch and carriage assembly along these rods between the face plate 22 and the lower plate 24. A weld mast 34 is mounted within the torch and carriage assembly 32 for vertical movement therewith and for rotational motion relative thereto. The upper end of the weld mast 34 extends through an opening in the face plate and carries a tungsten electrode 36 which extends radially therefrom. The mounting of the weld mast 34 in the torch and carriage assembly 32 is such as to provide a path for welding current to the tungsten electrode 36 as well as a supply of coolant fluid to the upper end of the weld mast. A first drive motor 38 is mounted to the torch and carriage assembly and provides mechanical power thereto to both rotate the weld mast 34 and cause the entire torch and carriage assembly to move at relatively slow speeds between the two facing plates 20 and 22. A second drive motor 40 is mounted on the lower plate 24 and, through a rapid traverse drive system 42 rapidly rotates the threaded rods 28 which, in turn, cause the torch and carriage assembly 32 to rapidly traverse the distance between the two plates 22, 24.

Other systems associated with the tube shrinking machine, i.e., the purge gas supply system 44, coolant supply system 46, and the DC power supply system 48 are all generally illustrated in FIG. 6 and will hereinafter be described in more detail.

Detailed Description of Carriage/Torch Assembly

Figure 7:
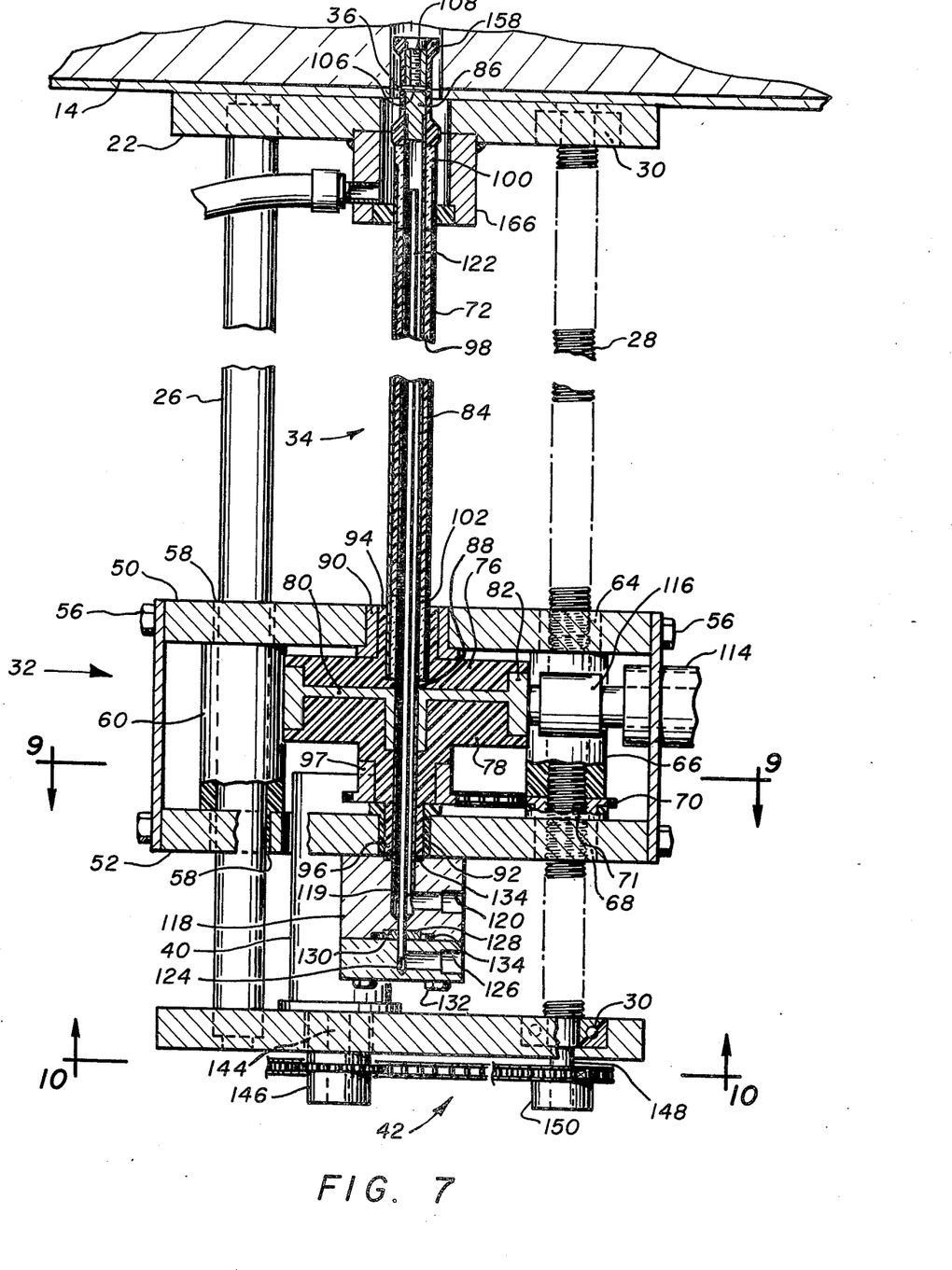
FIG. 7 is a sectional elevation illustrating the tube shrinking apparatus of the present invention in detail.
Figure 8:
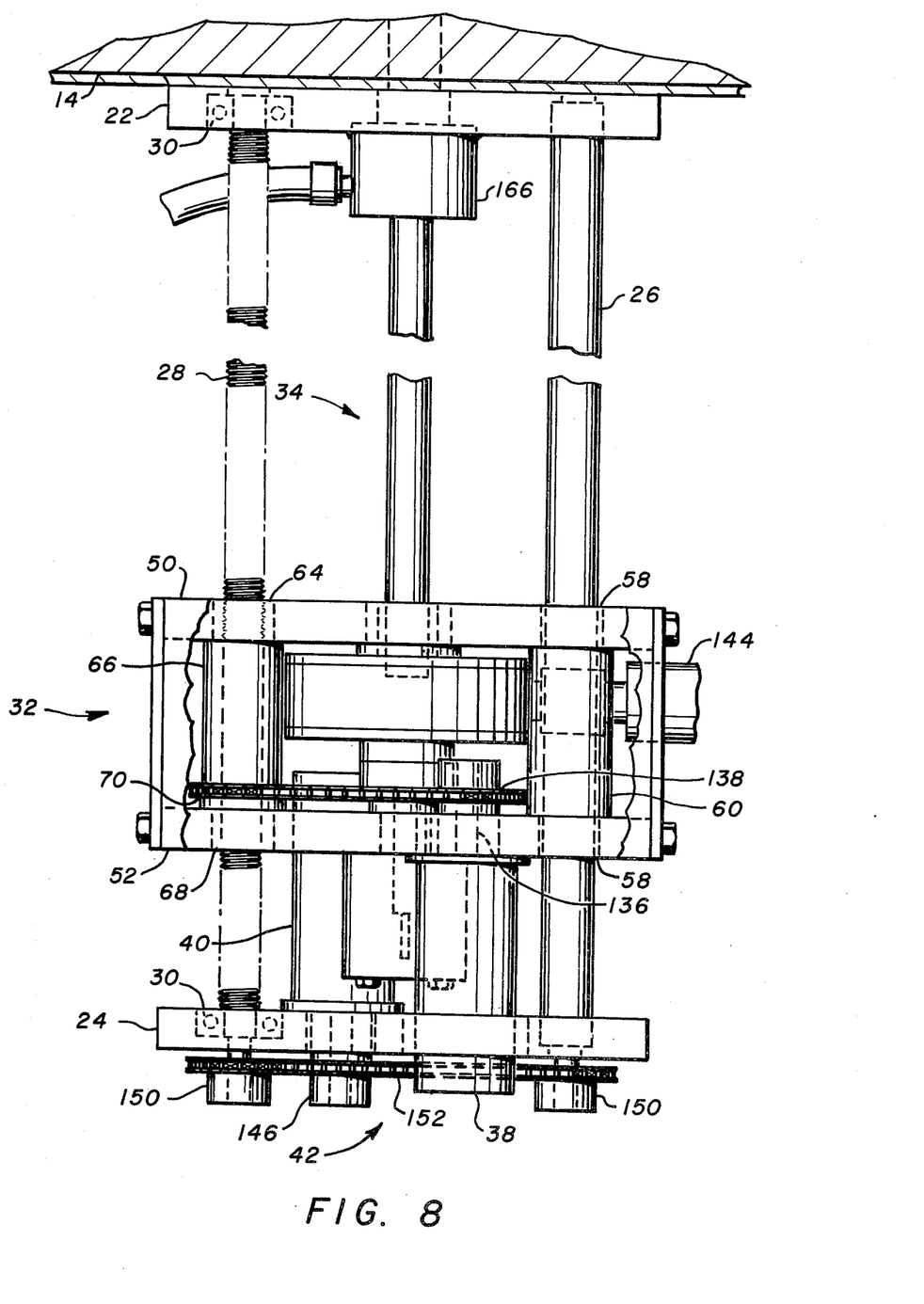
FIG. 8 is a side elevation illustrating the apparatus of the invention in detail.
Figure 9:
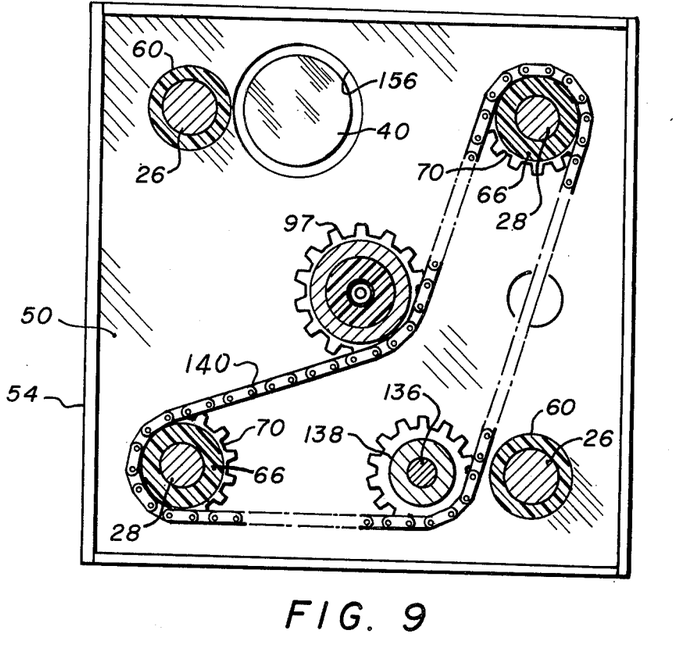
FIG. 9 is a view of the torch and carriage drive system layout taken along lines 9—9 of FIG. 7.

As indicated above, the torch and carriage drive assembly 32 is mounted for linear translation on the two guide rods 26 and the threaded rods 28. Reference to FIGS. 7, 8 and 9 clearly shows the positioning fo these four rods and their mounting to the face plate 22 and the lower plate 24, the guide rods being press fitted into these plates, and the threaded rods being supported for rotation by the bearings 30. The structural framework of the carriage is provided by a top plate 50 and a botton plate 52 which are held in parallel spaced relationship by side plates 54 which fastened to the ends of the top and bottom plate by suitable fastening means such as threaded connectors 56. Suitable openings are provided in the top and bottom carriage plates 50, 52 to receive the guide rods and threaded rods 26, 28. Referring to FIGS. 7 and 9, it is seen that the openings provided for the guide rods 26 are slightly oversized so as to receive the reduced diameter ends 58 of spacers 60 which extend between the top and bottom carriage plates and through which the guide rods pass. These spacers are made from a suitable low coefficient of friction material such as nylon to facilitate translation of the carriage assembly along the guide rods. The openings provided in the plates 22, 24 for the threaded rods 28 are also slightly oversized, however only the upper end 64 of the threaded rod spacers 66 is reduced to be received in the opening. The openings in the bottom plate 52 of the carriage through which the threaded rods pass are sized to receive an extension 68 of the hub of a chain drive sprocket 70. This sprocket is provided with internal threads 71 which are threadedly engaged with the external threads on the threaded rods 28. The lower ends of each of the spacers 66 bear upon the upper face of the sprockets 70 accordingly prohibiting axial motion of the sprocket. The cooperation of these sprockets with the carriage drive system will be described in more detail below.

As mentioned above, the weld mast assembly 34 is mounted in the torch and carriage assembly 32 in a manner permitting vertical motion therewith and for rotational motion relative thereto. Referring to FIG. 7, the weld mast/torch assembly comprises an outer structural tubing section 72 which carries the torch head 74 at its upper end and extends downwardly and is received structurally in the uppermost piece 76 of a two-piece rotor section made from a suitable insulating material. Sandwiched between the uppermost rotor section 76 and the lower section 78 is a disc shaped brass conductor 80 having an outer circumferentially extending enlarged portion 82. Each of the sections of the rotor and the conductor 80 are provided with an axial opening therethrough which receives a length of copper tubing 84 therewithin which extends downwardly beyond the lower end of the lower section 78 of the rotor and also upwardly to the welding head where it receives the lower end of the electrode holder assembly 86. A good electrical connection is made between the copper tube 84 and the brass conductor 80 as for example by a silver soldered connection 88 therebetween. The entire weld mast torch assembly is mounted for rotation in the carriage by means of upper and lower pilot bearings 90, 92 which are received in centrally positioned openings in the top and bottom plates of the carriage assembly, respectively. As seen in FIG. 7, a reduced section 94 of the upper piece of the rotor assembly is received in the upper bearing 90, while the lowermost section 96 of three reduced diameter sections of the lower piece 78 of the insulator rotor is received in the lower bushing 92. A drive sprocket 97 is press fitted onto another of the reduced diameter sections of the insulator rotor with the sprocket teeth lying in the same plane as the teeth of the two sprockets 70 associated with each of the threaded rods 28. The association of these sprockets with the torch and carriage drive system will hereinafter be described in detail.

Turning back to the torch assembly, as shown in FIG. 7, because of the difference in diameter of the outer structural tube 72 and the inner conducting copper tube 84, an elongated annular void is defined by these two members. This void is filled substantially along its entire length by a nylon filler tube 98 and with heat resistant inserts or spacers 100, 102 at the upper and lower ends, respectively.

As previously mentioned, the copper tube 84 which serves as the welding current conductor extends to the upper end of the weld mast torch assembly and receives the lower end of the electrode holder 86. The holder is made from a good conducting material such as brass. The tungsten electrode 36 is inserted in a horizontal opening 106 in the electrode holder and is held in the desired radially extended position by a set screw 108 which extends downwardly through a threaded opening in the upper end of the electrode holder. Welding current from a suitable DC power supply 48 is delivered to power input terminal 114 and is conducted through a brush assembly 116 to the enlarged section 82 of the brass conductor 80. The current then passes readily through the brass conductor upwardly through the copper tube 84 and the electrode holder 86 to the tungsten electrode 36 for the establishment of the welding arc. The other terminal of the power supply is connected to the workpiece in the case the tube sheet 14 as per standard arc welding practice.

As previously mentioned, the copper conductor tube 84 extends below the bottom of the two-piece insulating rotor 76, 78 and, as shown in FIG. 7, the lower end of the tube is received in a vertically extending opening in the coolant inlet-outlet manifold 118. The end of the tube 119 terminates just above the elevation in which a first horizontal passageway 120 communicates with the vertical passageway in the manifold. This first horizontal passageway 120 is connected to a source of coolant fluid which is pumped into the manifold and passes upwardly through the conductor tubing 84 and in contact with the lower end of the electrode holder 86 for removing heat therefrom. The coolant fluid is returned back to the coolant manifold 118 through a smaller diameter tube 122 extending from a location near the top of the weld mast down to the manifold where it is received in a reduced diameter section 124 of the central opening in the manifold. This tube terminates adjacent a second horizontal passageway 126 from which the coolant is passed from the manifold assembly. The coolant exit tube 122 is maintained in the desired axial position by a retaining disc 128 having a central opening which circumferentially surrounds and is welded to the tube. This disc is supported in a suitable cavity 130 provided in the inlet-outlet manifold 118. As is best shown in FIG. 7, the inlet-outlet manifold 118 is made from two pieces and is attached to the lower side of the bottom carriage plate 52 by suitable fastening means such as cap screws 132. Accordingly, coolant fluid may be admitted to the weld mast, as described above, through coolant inlet opening 120, passes up through the conductor tube 84 where it contacts the lower portion of the electrode holder 86 and from there passes down through the smaller diameter inner tube 122 back to the inlet-outlet manifold where it is expelled from the system through the outlet 126. Suitable O-ring sealing devices 134 are provided at several locations in the inlet-outlet manifold to insure that leakage of the coolant fluid does not occur.

Torch and Carriage Drive System

As has been previously indicated, the torch and carriage drive system is capable of simultaneously rotating the weld torch assembly 34 and linearly translating the entire carriage/torch assembly 32 between the upper face plate 22 and the lower plate 24. Some of the components of the torch and carriage drive system have already been described briefly in connection with the other principal components of the tube shrinking machine. However, in order to facilitate the overall description of this system they will be described again briefly at this time. Referring to FIG. 8, the torch and carriage drive motor assembly 38 is mounted to the underside of the bottom carriage plate 52 by suitable means such as threaded cap screws or the like (not shown). The motor drive shaft 136 extends upwardly through the lower plate and carries a drive sprocket 138 thereon. As has been previously described, each of the threaded rods 28 carries an internally threaded driven sprocket 70 which is threadably engaged with the rod and mounted adjacent the upper side of the bottom carriage plate 52. An annular thrust bearing/spacer 66 made from a low friction material such as nylon bears upon the upper face of each of the sprockets 70 and extends up to and bears upon the lower face of the top plate 50 of the carriage. As previously described and as best seen in FIG. 7, the torch rotation sprocket 97 is carried by a reduced diameter section on the lower portion of the insulator rotor 78. The teeth of the torch rotation sprocket 97, the two carriage translation sprockets 70 and the drive sprocket 138 carried by the torch and carriage drive motor shaft all lie in the same plane and are interconnected by a suitable drive chain 140 in a manner best shown in FIG. 9.

In operation, counterclockwise rotation of the motor shaft 136 as viewed in FIG. 9 will result in counterclockwise rotation of the two carriage translation sprockets 70 and clockwise rotation of the weld mast rotation sprocket 97. This arrangement results in a clockwise rotation of the weld mast/torch assembly 34. As the carriage drive sprockets 70 rotate counterclockwise they will try to move upwardly along the threaded rods 28, however, since the sprockets are restained axially with respect to the carriage by plate 52 and the nylon spacer 60, the entire carriage/torch assembly 32 is caused to move upwardly. Clockwise rotation of the torch and carriage drive motor will, of course, result in a counterclockwise rotation of the weld mast 72 and a downward translation of the carriage/torch assembly.

In the preferred embodiment the torch and carriage drive motor assembly 38 comprises a small DC electric motor and an integral planetary gear set within the drive motor assembly housing. The planetary gear set reduces the rotation to a relatively low RPM. For example, in a preferred embodiment the motor output shaft 136 turns at approximately 5 RPM. Through proper choice of the output RPM of this motor/gear set assembly and suitable sizing of the drive and driven sprockets the rotation and linear translation of the weld mast may be controlled as desired.

The Rapid Traverse Drive System

Figure 10:
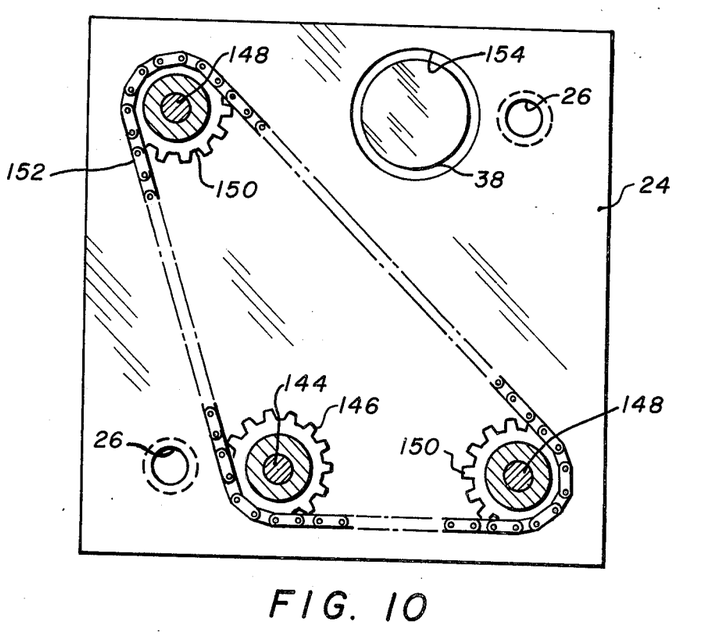
FIG. 10 is a view of the arrangement of the rapid traverse drive system taken along section line 10—10 of FIG. 7.

The rapid traverse drive system 42 is provided to rapidly translate the carriage/torch assembly 32 between the face plate 22 and the lower plate 24 so as to facilitate rapid positioning of the torch head 74 for the subsequent melting operation which involves either slowly spiraling the torch head down the tube or rapidly moving the head down to form a straight weld bead as set forth in the description of the method of the invention. The rapid traverse motor assembly is mounted through a flange 142 to the upper face of the lower plate 24 and has a drive shaft 144 which extends downwardly through the lower plate and carries a suitably sized drive sprocket 146 thereon. Also extending through the lower plate are extensions 148 from the lower ends of the two threaded rods 28, each of which also carries a sprocket 150. As best shown in FIG. 10, the rapid traverse drive system chain 152 extends about the outside of each of the driven sprockets 150 and the drive sprocket 146 so that each of the sprockets will rotate in the same direction when the motor is actuated. As with the torch and carriage drive motor assembly 38, the rapid traverse drive motor assembly 40 also comprises a small DC electric motor and an integral planetary gear set within the drive motor assembly housing. The planetary gear set in the rapid traverse drive motor assembly, however, is such as to provide a rapid traverse shaft 144 output of approximately 200 RPM. As a result, when the rapid traverse motor is actuated the rapid traverse sprocket 150 driven through the chain 152 will cause each of the threaded shafts 28 to rotate at a rapid speed and, depending upon the direction of rotation of the rapid traverse motor will cause through the driving engagement of the threaded shafts with the carriage drive sprocket 70, the entire torch/carriage assembly to rapidly translate either upwardly or downwardly between the plates 22, 24.

While each of the drive systems, i.e., the torch/carriage drive system and the rapid traverse drive system may be operated independently to achieve the desired motions of the torch mast and the carriage/mast assembly, a further feature of the invention is that these two systems may be operated simultaneously. As pointed out above, if the torch and carriage drive system is actuated by itself, and the welding arc established, an overlapping spiraling weld bead as shown in FIG. 2 will result. However, if it is desired to achieve an open spiral as shown in FIG. 3, the torch and carriage drive system and the rapid traverse drive system are both placed in operation. If both systems are actuated so as to cause the carriage assembly 32 to move downward, the downward speed will be the sum of the translation speed caused by the torch and carriage drive system alone plus that caused by the rapid traverse drive system. If the torch and carriage drive system is operated in a mode which would normally cause the carriage to translate upwardly and the rapid traverse drive system is actuated to cause the carriage to move downwardly, the net result will be a rotation of the weld torch opposite to that occurring in the previous example and a net downward motion of the carriage assembly equal to the difference of the translation speed of the rapid traverse drive system and the torch and carriage drive system. Such operations would result in closer spacing of the spiral weld bead as shown in FIG. 3.

Installation and Use of the Machine

Figure 5:
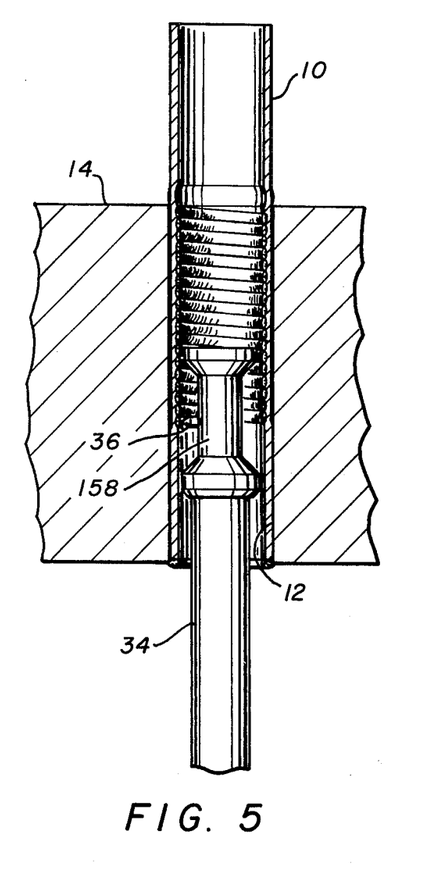
FIG. 5 is a sectional elevation showing a partially shrunk tube with the welding torch in operational position therein.

In use, the torch and carriage drive assembly 32 is caused to return to its lowermost position as shown in FIGS. 7 and 8. It should be noted that when in this position the two drive motor assemblies 38, 40 pass through openings 154, 156 respectively provided in the lower plate 24 and the bottom plate 52 of the carriage assembly. This permits the carriage assembly to be retracted to a position where the inlet/outlet manifold 118 is almost in contact with the top side of the bottom plate 24. In this position only the uppermost portion of the welding head 74 extends above the upper mounting plate 22. The machine is then positioned below the tube sheet 14 containing the tube to be removed and is attached by suitable means to the tube sheet, as by gripper means or the like extending into adjacent tube openings (not shown). As shown best in FIGS. 5 and 7, positioning of the weld head 74 within the tube to be removed is facilitated by a ceramic pilot member 158 which also serves as a gas shield during the welding operation. Following mounting on the tube sheet the rapid traverse drive system is actuated to fully extend the welding head 74 to the proper location adjacent the upper side of the tube sheet 14. All of the systems of the machine are then actuated to establish the arc and cause the welding head to return to its lowermost position following the desired motion (e.g. spiral, straight bead, etc.) as has been predetermined by the operator. Controlling and power inputs to the machine are achieved through conventional control apparatus (not shown) through the control input plug 160 as shown in FIG. 6. Suitable control signals and the necessary power are delivered to the rapid traverse drive motor 40 through extensible cord 164. In addition to the actuation of all of the systems discussed hereinabove, a continuous supply of purge gas must be provided to the region surrounding the arc in order to establish proper welding conditions. This gas is provided through a purge gas supply system 44 whereby gas is fed into a purge gas manifold 166 and passes upwardly around the outside of the weld mast 34 through the tube to the welding region. The heat shield/pilot assembly 158 is provided with a series of openings (not shown) on both the lower and upper portion in order to permit entry of the gas to the welding region. The openings on the upper side are smaller than the openings on the lower side to insure a pure purge gas atmosphere in the welding region.

It should thus be appreciated that a method for quickly and effectively reducing the diameter of a tube which has been expandedly mounted in a tube sheet has been provided which will permit such removal with virtually no damage to the interior surface of the opening of the tube sheet from which the tube is to be removed. Further, apparatus for carrying out the above method has been disclosed which permits a great deal of versatility in that it permits a variety of weld bead patterns to be made. The desired pattern in any particular application being dictated by the particular requirements of that application; for example, the necessity to completely eliminate any scoring on the interior wall of the tube sheet opening or a necessity for high speed in removing the tubes.

While these preferred embodiments of the invention have been shown and described, it will be understood that they are merely illustrative and that changes may be made without departing from the scope of the invention as claimed.

What is claimed is:

1. A method for removing a hollow metal tube from a tubesheet in which the tube is held by expansive forces in the tube, which comprises:
   a. establishing a gas-tungsten-arc between an electrode and the tube inner wall, said arc being sufficient to partially melt through said tube inner wall;
   b. traversing said arc along a path covering substantially the entire length of the portion of said tube contained in said tube sheet such that a sufficient portion of the tube inner wall is melted to cause the compressive forces of solidification shrinkage and thermal contraction to reduce the tube diameter to a dimension less than the original diameter when the melted portion is allowed to solidify;
   c. allowing the melted part of the tube to solidify; and
   d. withdrawing the tube from the tubesheet.

2. The method of claim 1 wherein the traversing of said arc includes longitudinally displacing said arc with respect to the longitudinal axis of said tube and simultaneously rotating said arc about said longitudinal axis, whereby said arc forms a weld bead in the form of a helix spiraling down the inside of the tube.

3. The method of claim 2 wherein said longitudinal displacement and said rotational motion are such that the motion of the gas-tungsten-arc forms overlapping weld beads covering substantially the entire inner surface of the tube wall.

4. The method of claim 1 wherein the traversing of said arc along the length of said tube comprises longitudinally translating said arc substantially the entire length of said tube thereby forming a single vertically extending weld bead on the inner surface of said tube wall.

5. The method of claim 4 including repeating the linear translation of said arc along the inner surface of said tube wall one or more additional times.

6. The method of claim 5 wherein the vertically extending weld beads formed by each longitudinal translation of said arc are equally spaced about the circumference of said tube.

7. The method of claim 1 wherein the depth of melting of the tube wall is between 50 and 95 percent of the wall thickness.

8. The method of claim 7 wherein the preferred depth of melting is 75 percent of the thickness of the tube wall.

* * * * *